US00RE44213E

(19) United States
(12) Reissued Patent
Della Casa

(10) Patent Number: US RE44,213 E
(45) Date of Reissued Patent: May 14, 2013

(54) CENTRIFUGAL SEPARATOR FOR MIXTURES IN A LIQUID OR GASEOUS MEDIUM

(76) Inventor: Luigi Pietro Della Casa, Padula Scalo (IT)

(21) Appl. No.: 13/417,160

(22) Filed: Mar. 9, 2012

Related U.S. Patent Documents

Reissue of:
(64) Patent No.: 7,905,360
Issued: Mar. 15, 2011
Appl. No.: 11/630,286
PCT Filed: Jul. 8, 2004
PCT No.: PCT/IT2004/000377
§ 371 (c)(1),
(2), (4) Date: Apr. 2, 2007
PCT Pub. No.: WO2006/006186
PCT Pub. Date: Jan. 19, 2006

(51) Int. Cl.
*B04B 5/12* (2006.01)
*B04B 11/00* (2006.01)

(52) U.S. Cl.
USPC ..... 210/380.1; 494/1; 494/60; 494/74; 494/75; 55/407; 55/432

(58) Field of Classification Search ..... 210/380.1, 210/512.1, 512.3; 494/1, 60, 74, 75; 209/732; 55/407, 432
See application file for complete search history.

(56) References Cited

U.S. PATENT DOCUMENTS 3,094,828 A * 6/1963 Payne et al. ..... 210/512.1
3,734,401 A * 5/1973 Frewen ..... 494/2

FOREIGN PATENT DOCUMENTS

DE 10035055 A1 * 1/2002
EP 745418 A1 * 12/1996
FR 2535216 A1 * 5/1984
WO WO 2004050255 A2 * 6/2004

OTHER PUBLICATIONS

PCT International Search Report for PCT/IT2004/000377, dated Mar. 7, 2005.*
PCT Written Opinion for PCT/IT2004/000377, dated Mar. 7, 2005.*
PCT Translation of the International Preliminary Report on Patentability for PCT/IT2004/000377, dated Feb. 11, 2006.*
PCT International Preliminary Report on Patentability for PCT/IT2004/000377 filed on Jul. 8, 2004 in the name of Luigi P. Della Casa.
PCT International Search Report for PCT/IT2004/000377 filed on Jul. 8, 2004 in the name of Luigi P. Della Casa.
PCT Written Opinion for PCT/IT2004/000377 filed on Jul. 8, 2004 in the name of Luigi P. Della Casa.

* cited by examiner

*Primary Examiner* — David A Reifsnyder
(74) *Attorney, Agent, or Firm* — Steinfl & Bruno LLP

(57) ABSTRACT

The invention concerns a separator, wherein the mixture, after passing through the inlet channels of the container body (1), penetrates into the admission chamber (30) of the rotor (2), where blades (35) arranged in star formation and perpendicular to the axis of rotation produce a centrifugal propulsion and, further, compact the components with greater density, thus facilitating extraction thereof. The thus modified mixture passes into the separating chamber (31), where blades (36) arranged in star formation and parallel to the axis of rotation, through their centrifugal force, push the components with greater density outwards; the latter having penetrated into the collecting cells (41) of the grid (34) which is coated on the outside of the separating chamber, through holes (42) exit from the rotor upon reaching the accumulation chamber (13). The fluid medium which, countered by a suitable pressure, cannot penetrate into the accumulation chamber, exit through evacuation channels. An electromechanical control system (3) adjusts the functioning of the method.

36 Claims, 5 Drawing Sheets

CENTRIFUGAL SEPARATOR FOR MIXTURES IN A LIQUID OR GASEOUS MEDIUM

Matter enclosed in heavy brackets [ ] appears in the original patent but forms no part of this reissue specification; matter printed in italics indicates the additions made by reissue.

TECHNICAL FIELD

The purpose of the invention is the separation, from a continuously flowing fluid mixture, of any components that have a greater density or molecular mass than that of the medium itself. As the method makes use of centrifugal force to achieve this, it can be classified in the category of centrifugal separators.

BACKGROUND

The centrifugal separators appertaining to the current state of the art are essentially formed by a cylindrical chamber which rotates at high speed. It is into this chamber that the fluid mixture to be treated enters. The fluid is rotated along with the chamber and thus, due to centrifugal force, the higher density components accumulate on the inner walls of the cylinder, whereas the liquid medium, at lower density, comes out of the cylinder.

A cochlea is used to push the accumulated material out of the centrifugation chamber. Alternatively, it is necessary to interrupt the rotation in order to empty the separator. These types of centrifugal separators cannot be used on mixtures in a gaseous medium.

There are separators for oleaginous mists that are equipped with a porous filter which rotates in a chamber. This type of separator only uses centrifugal force to project the oil, which condenses on passing through the micro-channels, against the inner wall of the chamber. The use of this type of separator is necessarily limited to mists.

The document entitled DE 100 35 055 A1 (INNOVA ENTWICKLUNGS) describes a separator which has an annular separation chamber. The document entitled WO 2004/050255 A2 describes a gas separator.

BRIEF DESCRIPTION OF DRAWINGS

N.B.: Arrows have been used to indicate cavities or spaces.

The axonometric figures are, in relation to FIGS. 1 and 3, at a slightly reduced scale (−10.14%), except FIG. 9 which is slightly enlarged (+6.53%).

Figure 2:
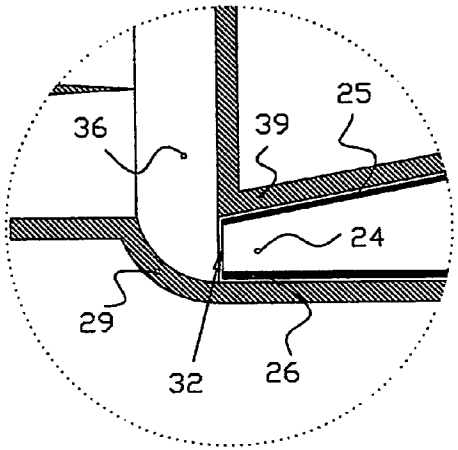
Figure 1:
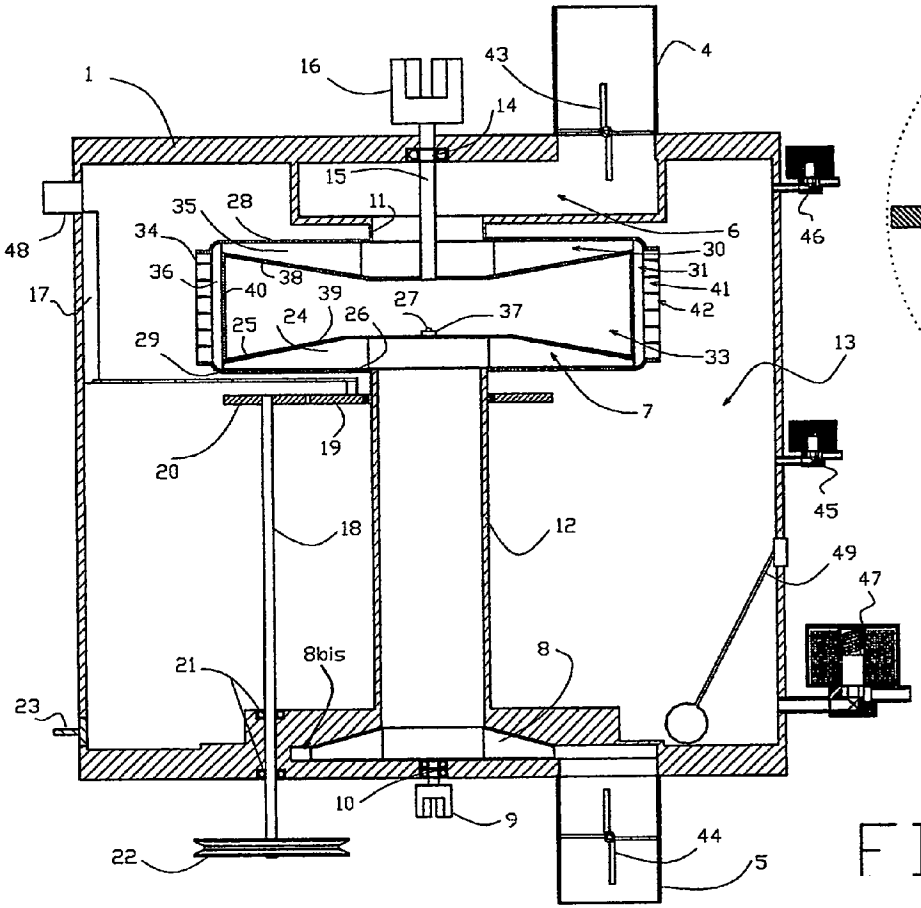
FIG. 1
Figure 4:
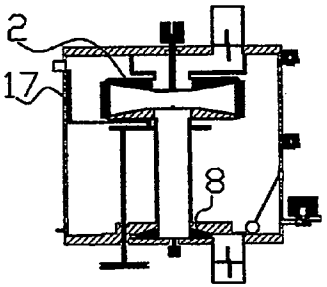
Figure 3:
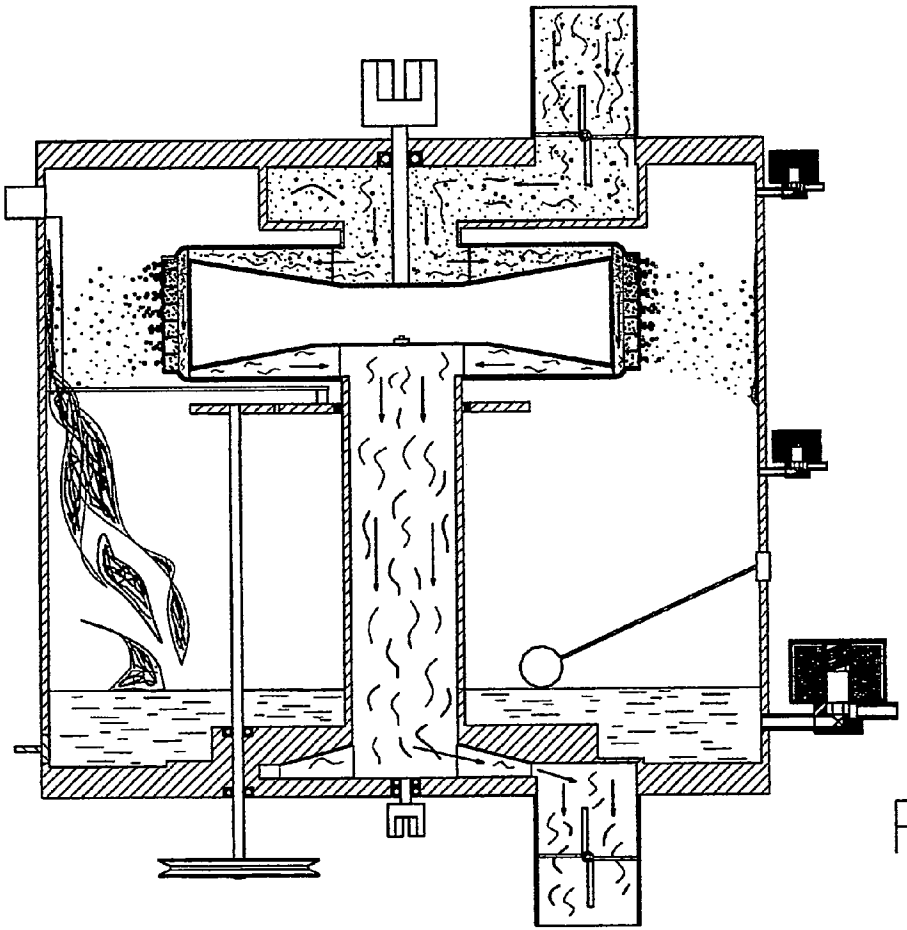

A longitudinal section of the separator is depicted in this figure with full labeling and numbering of all the components, with the exception of the outlet chamber (32).

FIG. 2

This figure shows a detail of separator by which the outlet manifold (7) is pointed out with its components (bell cap (25), support (26), and vanes (24)) and the almost virtual space (outlet chamber (32)) which separates it from the rotor (2).

FIG. 3

This figure depicts a longitudinal section of the separator with a reproduction of it in operation.

FIG. 4

This figure depicts the schematics of a longitudinal section of the separator at a much reduced scale.

The numbered parts in black represent the components with rotatory movement.

FIG. 5

This figure shows an isometric orthogonal axonometric view from below with a longitudinal section of the housing (1).

FIG. 6

Figure 5:
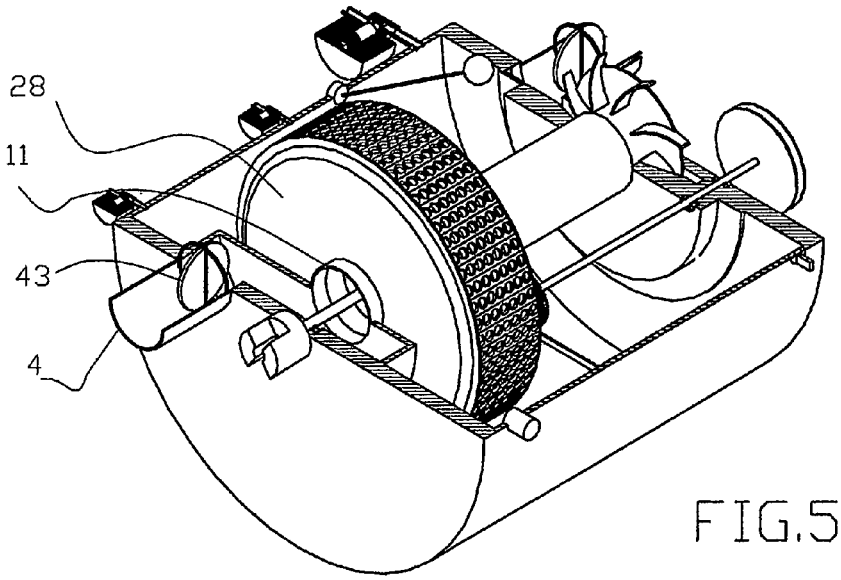
Figure 6:
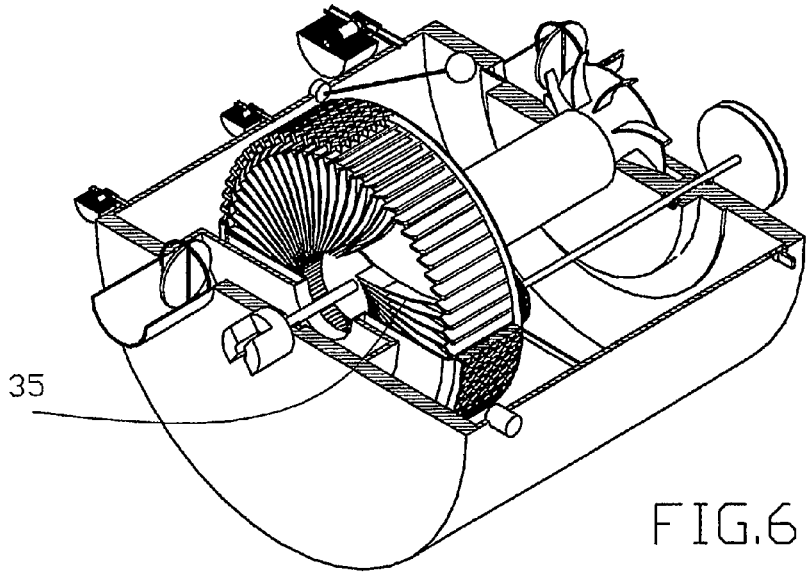

This figure shows the same view as FIG. 5, but also includes the longitudinal section of the upper cover plate (28), of the inlet axial tube (11) and a hemi section of the grill (34). Some of the inlet vanes have been removed in order to convey their relationship more clearly.

FIG. 7

This figure shows an isometric orthogonal axonometric view from below with a longitudinal section of the housing (1), of the lower cover plate (29) and of the outlet manifold (7) in order to show empty and visible one half of the outlet chamber (32).

FIG. 8

Figure 7:
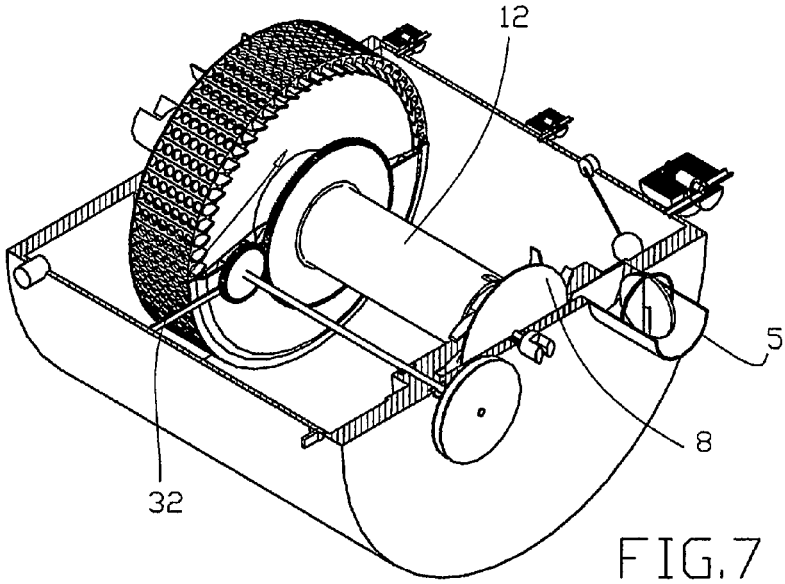
Figure 8:
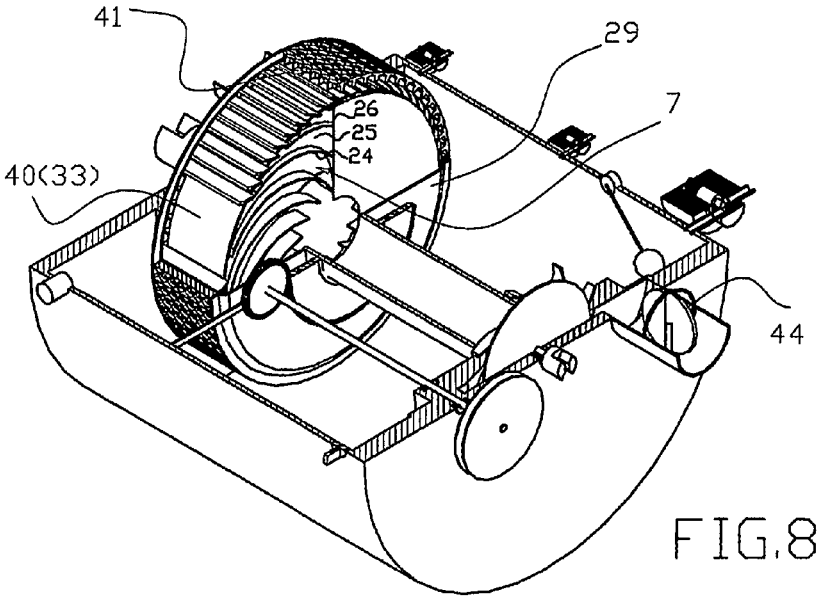
Figure 9:
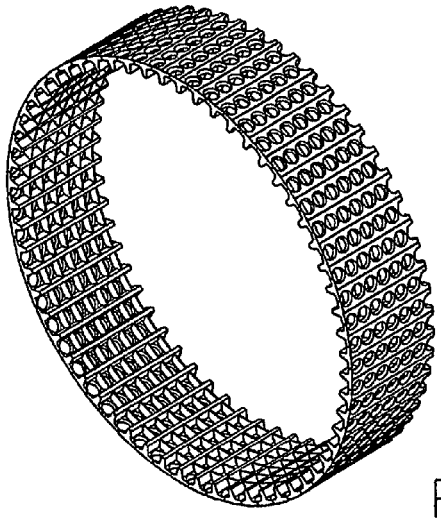
Figure 10:
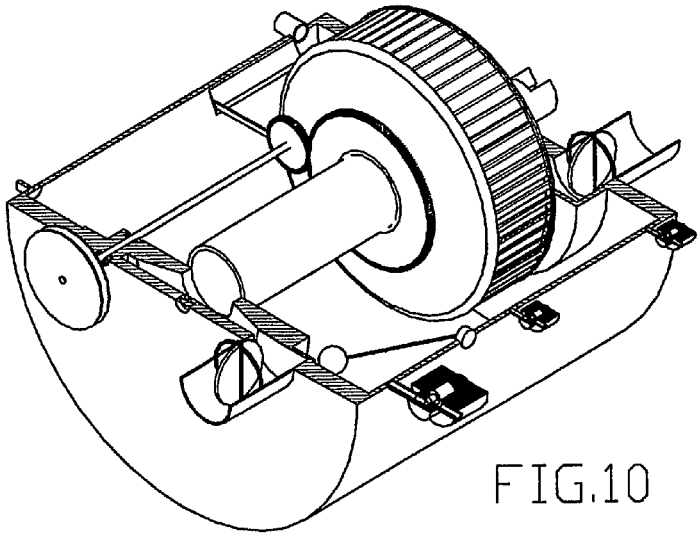

This figure shows the same view as FIG. 7, but also with a longitudinal section of the outlet axial tube (12) and of a gear (19); without the longitudinal section of the outlet manifold (7) except for its support (26). There is also a hemi section of the grill (34) and some separation vanes (36) have been removed in order to represent their relationship more clearly.

FIG. 9

This figure shows an axonometric view of the grill (34).

FIG. 10

This figure illustrates the separator without the grill (34) and the outlet pump (8).

DESCRIPTION OF THE INVENTION

This separator can be used for fluid mixtures both in a liquid medium as well as in a gaseous medium. It is made up of several components, some of which need not be utilized depending on the case in hand (particularly when used on mixtures in a gaseous medium).

The separator is composed of the following structures:

1) Housing
2) Rotor
3) Control system

HOUSING (1), which comprises the following:

4) Inlet pipe
5) Discharge pipe
6) Inlet manifold
7) Outlet manifold
8) Discharge pump (superfluous when used for mixtures in a gaseous medium, except for the capsule which is substituted by a discharge manifold (8 b))
9) Joint with hinge pin (superfluous when used for mixtures in a gaseous medium)
10) Ball bearings (superfluous when used for mixtures in a gaseous medium)
11) Inlet axial tube
12) Outlet axial tube
13) Accumulation chamber
14) Ball bearing
15) Driving shaft
16) Joint
17) Polishing blade
18) Shaft
19) Large cog wheel
20) Small cog wheel
21) Ball bearings
22) Pulley
23) Cap The outlet manifold (7) comprises:

24) Outlet vanes
25) Bell cap
26) Support
27) Pivot

ROTOR (2), which is composed of the following:

28) Upper cover plate
29) Lower cover plate
30) Inlet chamber
31) Separation chamber
32) Outlet chamber
33) Diaphragm chamber
34) Grill (this is not necessarily essential especially when used for mixtures in a gaseous medium).

The inlet chamber (30) comprises:

35) Inlet vanes

The separation chamber (31) comprises:

36) Separation vanes

The diaphragm chamber (33) comprises:

37) Ball bearing
38) Upper wall
39) Lower wall
40) Tubular wall

The grill (34) comprises:

41) Collection cells
42) Apertures

CONTROL SYSTEM (3), which comprises the following:

43) Electro mechanical inlet diaphragm (or a mechanical inlet valve)
44) Electro mechanical outlet diaphragm (or a mechanical outlet valve)
45) Electromagnetic valve for the compressor
46) Electromagnetic valve for gas discharge
47) Electromagnetic valve for liquid discharge
48) Pressure sensor
49) Liquid level sensor
50) Electronic control circuit (not depicted in the diagrams)
51) Gas compressor (not depicted in the diagrams)
52) Reservoir (not depicted in the diagrams)

(The numbers to the left of the components above correspond to those used in the drawings and are often used in the text to the right of the component name).

Housing (1):

This is a closed structure which, externally, can have various shapes. However, for the sake of clarity of description we will consider it cylindrical.

The inflow and outflow of the separator are ensured by the inlet pipe (4) and the discharge pipe (5). One of these is mounted eccentrically on one of the flat surfaces; the other is also fixed eccentrically on the opposite surface. They communicate with the inlet manifold (6) and the discharge pump capsule (8) respectively, which becomes a discharge manifold (8 bis) for gaseous mixtures. The inlet manifold (6) continues along a short inlet axial tube, (11) around which the rotor (2) revolves.

The flat surface, where the inlet pipe (4) is fixed, houses a watertight ball bearing (14) for the mechanical driving shaft (15) of the rotor (2).

The outlet manifold (7) is composed of a certain number of vanes (24) mounted radially on a support (26) in the shape of a circular crown.

Their axis is perpendicular to that of the rotation of the rotor (2) and inclined backwards in relation to the direction of the rotation. As such, this axis forms a certain angle, with an ideal radius passing through the innermost extremity. Along this axis, the vanes are slightly curved with an anterior convexity.

This enables the fluid to flow back into the centre where the outlet axial tube (12) begins. The upper surface of the outlet manifold (7) is covered by a thin bell cap (25). At the top of this bell cap (25) there is a pivot (27) that fits in the ball bearing (37) of the diaphragm chamber (33).

The outlet manifold (7) is housed in the outlet chamber (32) of the rotor (2). The rotor (2) revolves around the outlet manifold (7) and the outlet axial tube (12). The outlet axial tube (12) connects the outlet manifold (7) to the capsule of the discharge pump (8) or the discharge manifold (8 b) (if the pump (8) is not used).

The discharge pump (8) is a centrifugal pump which is housed at the end of the outlet axial tube (12) in the wall where the discharge pipe (5) is mounted. It is activated by a joint with a hinge pin (9) which passes through two watertight ball bearings (10). By means of an appropriate transmission connection, the traction may depend on either the motor of the separator itself or an independent one.

The important thing is that the flow rate and the pressure gradient generated are regular so that the upstream pressure in the separation chamber (31) is equal, on scalar value, to the downstream depression of the chamber.

The remaining space in the housing (1) is occupied by the accumulation chamber (13). This chamber (13) communicates, directly, only with the collection cells (41) of the grill (34) via the apertures (42), and from there with the separation chamber (31) of the rotor (2). In the case that the grill (34) is not used, the chamber (13) communicates directly with the separation chamber (31).

At the top of the accumulation chamber (13) there is a an opening for an electromagnetic valve (46) which connects to the exterior and a second opening for an electromagnetic valve (45) which communicates with a compressor (not depicted in the drawings).

A third electromagnetic valve (47) positioned close to the bottom is designed for liquids and connect the accumulation chamber (13) with a reservoir (not depicted in the drawings).

The discharge pump (8) is, in practice, unnecessary when the separator is being used on gaseous fluids.

Rotor (2)

It is composed of:

Inlet chamber (30)

This chamber is truncated cone- (or cup-) shaped with the large base directed upwards. The outside edge is cut vertically thus forming an opening at the belt.

The chamber (30) is enclosed below by the upper wall (38) of the diaphragm chamber (33) and above by the upper cover plate (28). In the centre of the upper cover plate (28) there is an aperture which houses the inlet axial tube (11) around which the cover plate (28) (which is fixed to the rotor (2)) revolves. This moving joint is watertight. The inlet axial tube (11) connects the inlet chamber (30) to the inlet manifold (6). The external surface at the belt of the inlet chamber (30) is open so that it communicates with the separation chamber (31). The cross-section dimension (the opening) of the inlet tube (11) and the cross-section of the belt opening mentioned above must correspond. In this chamber (30) there are a number of vanes (35) arranged radially and inclined in the same way as the vanes (24) of the outlet manifold (7). They are slightly curved with the concavity at the front. Their upper and lower edges are attached to the upper cover plate (28) and the upper wall (38) of the diaphragm chamber (33) respectively. Their internal extremity is positioned slightly outside the central aperture, that external where the separation chamber (31) begins.

Separation Chamber (31)

This is a volume with a circular crown-shaped cross section.

Both diameters of the crown are the same along the entire chamber (31).

Its curved interior surface (tubular) is open, above and below, via two windows at the belts allowing communication with the inlet (30) and outlet chambers (32). It is enclosed above and below by the upper (28) and lower (29) cover plates respectively which, in forming a 90 degree arc, cover its external surface at the level which allows the connection of this chamber (31) with the inlet (30) and outlet chamber (32). The edges of this covering (formed by the two cover plates (28) (29)), correspond with the upper and lower borders of the tubular wall (40) of the diaphragm chamber (33). The external surface of the chamber (31) is exposed, except at a level of the belt windows connecting with inlet and outlet chambers. If need be, it can be covered by the grill (34).

The separation chamber (31) houses a certain number of rectangular (or quadrangular) separation vanes (36). These are arranged radially at regular intervals, with one axis parallel to that of the rotation of the rotor and the other perpendicular to the axis of rotation and inclined backwards in relation to the direction of rotation, forming an angle of around 45-60° with the ray of the rotation plane. The vanes are slightly curved on the axis that is perpendicular to that of the rotation, with the convexity orientated to the front, with an angle of around 20° at the centre.

The edges of the separation vanes (36) are attached on top to the upper cover plate (28) and below to the lower cover plate (29). Internally they are attached to the tubular wall (40) of the diaphragm chamber (33). As we have already mentioned, externally they are covered, above and below, by the upper (28) and lower cover plates (29) on the segments corresponding to the communication window with the inlet (30) and outlet chambers (32). The part that remains or continues along the longitudinal walls of the collection cells (41) of the grill (34) is exposed if it is not used.

The number of vanes mounted must be compatible with the coarseness of the components of the fluid mixture, which can enable a clogging of the space between them. For example, for a separation chamber (31) with an internal radius of 8 cm and an external radius of 9 cm, the number of vanes used may vary depending on the characteristics of the components to be extracted from the fluid as well as the viscosity of the medium, from between approximately 8 and 380.

In the case of a gaseous medium where the friction is low, it is advisable to use a large number of separation vanes (36). In the case of a mixture in a dense liquid medium, if a grill (34) equipped with collection cells (41) is used, it is possible to use a small number of these vanes (36), even only two. However, in reducing the number of separation vanes (36), the compacting of the larger density components is also reduced. (See below).

Outlet Chamber (32)

This is a cavity much the same as the inlet chamber (30), but positioned in the opposite direction. Its height will be less than that of the inlet chamber (30), in proportion to the reduction in volume of the fluid after the separation process. Above, it is enclosed by the lower wall (39) of the diaphragm chamber (33). In the center of the lower cover plate (29), which encloses and delimits from below the lower part of the outlet chamber, there is an aperture which allows the passage of outlet axial tube (12), around which the cover plate (29) (which is fixed to the rotor (2)) revolves. This moveable juncture is watertight.

The outlet manifold (7) is housed in this chamber (32). This manifold (7) continues by the outlet axial tube (12). The space between the outlet manifold (7) and the walls of the outlet chamber (32) is almost non-existent. The rotor (2) can rotate around it without any friction.

Diaphragm Chamber (33)

This is a volume defined by two empty truncated cones (or cups) positioned in the opposite direction, with their larger bases connected by a tubular structure and smaller bases pointing towards each other.

For the sake of descriptive ease, we will make a distinction between three different walls—a tubular wall (40), an upper wall (38) and a lower wall (39). The tubular wall (40) also constitutes the inner wall of the separation chamber (31). As already mentioned, the upper (38) and lower (39) walls also constitute the lower wall of the inlet chamber (30) and the upper wall of the outlet chamber (32). The height of the truncated cones will depend on the necessary inlet and outlet flow rates.

The chamber (33) is completely closed. At the center of the lower wall, on the upper slope, there is a watertight ball bearing (37) mounted. This is penetrated by the pivot (27) of the bell cap (25) of the outlet manifold (7) via an aperture.

Grill (34)

This is a tubular structure which covers the exposed outer wall of the separation chamber completely (31).

Embedded in its wall are the channels, whose direction is parallel to that of the axis of rotation. The channels continue towards the exterior, positioned between the separation vanes (36). Their lateral and longitudinal walls are a continuation of the separation vanes (36).

These channels, equal in number to that of the separation vanes (36), are shaped in such a way that their cross-section is a semi-circle or a semi-ellipse or a circular arc and positioned with the curved slope towards the exterior. The interior slope of the channels is completely exposed, connecting the channels formed by the separation vanes (36) to the channels of the grill (34).

These channels are sub-divided by very thin walls, which are positioned perpendicularly to the axis of rotation, thus forming the collection cells (41). The outer wall of each cell (41) is completely exposed in cases where gaseous fluids are used, or are pierced by circular apertures (42) when liquid fluids are used.

These circular apertures (42) must not have a diameter that exceeds the limit determined in proportion to the surface tension of the liquid medium and the total density of the mixture. For low total densities of the mixture, if the medium is water, this diameter should not be greater than approximately 8 mm.

The passage from the cell (41) cavity to the aperture (42) should be rounded in order to avoid obstruction of the sliding of the compacted particles. The outer wall of the grill (34) preferably has a polygonal cross-section, with the same number of sides as that of the grill channels (and the number of rows of the collection cells (41)). As such, the outlet of the apertures (42) is a flat surface. Preferably, there should be a thickness of some decimillimeters between the margins of the apertures (42). The grill (34) is enclosed above by the upper cover plate (28) and below by the lower cover plate (29).

Upper Cover Plate (28)

This thin structure covers the inlet chamber (30) and the separation chamber from above, without any continuation solution and in a watertight fashion, in following the separation chamber (31) on the external surface at belt, in level of communication with the inlet chamber (30). Furthermore, it closes off the grill (34) from above. The inlet axial tube (11)

penetrates the cover plate's central aperture which, if possible, is equipped with a gasket made out of appropriate material.

Lower Cover Plate (29)

In practice, this is identical to the upper cover plate (28) except for the fact that it covers the outlet chamber (32), the separation chamber (31) and the grill (34) from below; the part at belt which covers the outer wall of the separation chamber, if necessary, is shorter. The outlet axial tube (12) penetrates the cover plate's central aperture which, is possibly equipped with a gasket made out of appropriate material. The central apertures of these two cover plates (28) (29) allow these, along with the rotor (2) to which they are fastened, to rotate around the two axial tubes (11) (12), which are immobile.

Control System (3) (not Depicted Individually in the Drawings)

Utility of the control system can be limited, especially when using mixtures in a gaseous medium. It is composed of: an electro mechanical inlet diaphragm (43) (or a mechanical inlet valve), and electro mechanical outlet diaphragm (44) (or a pressure valve with adjustable aperture, in the case of liquid fluids, or a common mechanical outlet valve if the mixture is in a gaseous medium), a pressure sensor (48), a liquid level sensor (49), three electromagnetic valves (45)(46)(47), a gas compressor (51) (not depicted), an electronic control circuit (50) (not depicted), a reservoir (52) (not depicted). When using mixtures in a gaseous medium, the compressor and its electromagnetic valve may not be used (45).

The electro mechanical inlet diaphragm (or the mechanical inlet valve) is housed upstream of the inlet manifold (6). The electro mechanical outlet diaphragm (43) (or the outlet valve) is inserted downstream of the discharge pump (8) or, in its absence, downstream of the discharge manifold (8 b).

The electro mechanical diaphragm is essentially comprised of a swivelling disk about a medial axis. With the help of a spring and the re-entry of a special closeout mechanism, the disk is positioned parallel to the flux, thus allowing it to flow uninhibited. A small electric motor allows the return to the closeout position.

When using liquid mixtures, the outlet valve must have an adjustable aperture pressure. Two of the three electromagnetic valves (45) (46) (47) are designed for gas (45) (46) and are fitted in the wall of the accumulation chamber (13), towards the top. One (45) of these communicates with the gas compressor, the other (46) with the outside. The third (47) is designed for dense liquids and is housed in the wall of the accumulation chamber (13), towards the bottom. It connects the accumulation chamber (13) with a reservoir (not depicted in the diagrams). If necessary, an axial pump can be used to aid the flow of very dense liquids. If needed, a turbidimeter and a densimeter can also be used.

Operation of the Centrifugal Separator

The inlet vanes (35) rotate thus producing the centrifugal force necessary for the propulsion of the fluid. Due to this propelling force, the fluid passes into the separation chamber (31). If the separator is fed by a pump or if there is an upstream external force, these two forces will naturally add to the propulsion. It is possible to limit the flow rate by restricting the aperture of the electro mechanical inlet diaphragm (43) or by means of an inlet tap.

The closure of the outer surface of the separation chamber (31), level with the inlet chamber (30) and for the height of the belt opening which connects them, prevents the fluid from entering the accumulation chamber (13) directly. Thus, the fluid is diverted and propelled along the channels between the separation vanes (36).

The rotation of the fluid, which takes place in the area that is not covered by the upper cover plate (28) of the separation chamber (31), would generate the passage of the fluid into the collection cells (41) of the grill (34) and subsequently into the accumulation chamber (13), in accordance with the laws of centrifugal force.

This movement of the fluid, in the case of mixtures in a liquid medium, must be limited to avoid the flooding of the accumulation chamber (13) and, as a result, causing a reduction in the angular velocity of the swiveling of the rotor. This phenomenon can be avoided by a preemptive gaseous pressure in the accumulation chamber (13) generated by a compressor that is activated by the electronic circuit of the control system (3). This pressure would be equal to the addition of the centrifugal force, which propels the fluid into the accumulation chamber (13), together with the pressure that derives from the resistance to the flow of the fluid towards the exterior of the separator.

The correct functioning of the outlet pump (8) neutralizes the resistance of the flow of the fluid towards the exterior of the separator by means of discharge. Furthermore, through appropriate regulation, it will neutralize the pressure gradient generated by the force of gravity between the top and bottom of the chamber (31).

As a result, the pressure that propels the fluid from the separation chamber (31) to the accumulation chamber (13) will depend solely on the centrifugal force generated in the separation chamber (31). The use of this pump (8) for mixtures in a gaseous medium is relative. The problem of flooding the accumulation chamber (13) does not exist for mixtures in a gaseous medium.

The presence of the grill (34) is essential for mixtures in a liquid medium in order to avoid that the air compressed in the accumulation chamber (13) forces the outer stratum of the liquid present in the separation chamber (31), and that by penetrating the strata of the lower pressure liquids, escape from the accumulation chamber which would be flooded by the liquid.

This would occur if the liquid surface, on direct contact with the gaseous surface, is not circular or is too large. As such, it would produce, in the case of a circular surface, a meniscus that is too heavy at the centre. This meniscus would generate a depression which would in turn facilitate the penetration of the compressed air of the accumulation chamber into the liquid.

Because of this phenomenon, it is necessary to surround the contact surface between the separation chamber (31) and the accumulation chamber (13) with a tubular wall that contains a number of equally circular apertures (42). These apertures will have an approximate 8 mm diameter in the case of aqueous mediums and for low total densities of the mixture. A short circular channel (about 1% of the diameter of the aperture) between the aperture (42) and the collection cell (41) will allow improved stability of the uncovered surface of the liquid.

The transversal subdivision of the channels of the grill into collection cells (41) will limit any turbulence caused by the friction between the fluid that flows along the separation chamber, (31) and that which is in the grill (34) being more or less immobile.

The grill (34) will also eliminate any friction between the fluid in the separation chamber (31) and the fluid in the accumulation chamber (13), thus reducing any resulting turbulence. Turbulence can cause the re-entry of high density components into the separation chamber (31), especially in the case of separation chambers (31) with a very small "critical space" (the difference between the internal and external radii). Therefore, due to the turbulence limitation, the grill (34) is both useful for liquid and gaseous fluids. The collection cells (41) also allow the denser components to accumulate. As such they form a body with an increased mass which, propelled by a sufficiently high centrifugal force, can be expelled into the accumulation chamber (13).

In the case of mixtures in a gaseous medium, it is possible to use a grill (34) with slotted apertures (42). It is also possible to leave only a belt of the exposed surface in the upper part of the separation chamber (31). In the end, it is also possible not to use the grill (34) especially, but not exclusively, for mixtures in a gaseous medium. Behavior of the mixture in a liquid medium will now be described.

The gas that is present between the separation vanes (36) is propelled towards the accumulation chamber (13). As a result, the gaseous pressure will be lower in these areas than in the accumulation chamber (13). As a consequence of this, the mixture will be propelled towards the outlet of the separation chamber (31).

When it arrives in the outlet manifold (7), there is no possibility of replacing the gas by pushing in the accumulation chamber (13) and the discharge is closed off by the outlet diaphragm (44). There will be a sudden increase in the pressure of the fluid and, as a result, the inflow of the fluid in the accumulation chamber (13). Therefore there will also be a rapid increase in the gaseous pressure and in the volume of the liquid.

Due to the control system (3) (more specifically the pressure sensor (48), the liquid level sensor (49) and the electronic circuit (50)), this phenomenon will cause the electro mechanical outlet diaphragm (44) to open rapidly, or it will simply provoke the opening of a valve with an appropriately regulated aperture pressure. As a result, this will cause a reduction in the resistance of the discharge channels to levels close to atmospheric pressure. The fluid will then move towards the outlet of the separator.

The closure of the electro mechanical diaphragm (44) until the fluid arrives at the threshold of the outlet manifold (7) is essential for liquid fluids. The reason for this is to avoid the air that has been compressed in the accumulation chamber from escaping through the outlet manifold (7) to the exterior, thus allowing the fluid to flood into the accumulation chamber (13) and prevent or inhibit the swiveling of the rotor (2) due to its viscosity. This problem does not occur for mixtures in a gaseous medium.

The closure of the inlet diaphragm (43) prevents the gas that has been compressed in the accumulation chamber (13) from rising back along the entry channels at the end of the cycle and thus allowing a penetration of the liquid (when using liquid mediums) into the accumulation chamber (13).

The closure of the discharge downstream of the separation chamber (31) at the end of the cycle prevents the gas that is compressed in the accumulation chamber (13) from escaping from the chamber (13) to the exterior of the separator. In the case of gaseous fluids, the closure of the two diaphragms (43) (44) or the two valves prevents the dispersion of particles to the exterior.

The discharge pump (8), useful for mixtures in liquid mediums, prevents the generation of a pressure gradient (no matter how small) between the initial part of the separation chamber (31) and the end of the chamber.

This will avoid the loss of gas from the accumulation chamber (13) through the final section of the separation chamber (31) and the loss of fluid from the initial section of this chamber (31) into the accumulation chamber (13).

As we have already mentioned, it is necessary to design and regulate the outlet pump (8) in such a way that it produces the same flow rate and the same propulsion as those at the entrance of the separation chamber (31).

By means of the control system (3) it is possible to prevent the liquid medium of the mixture from invading the accumulation chamber (13) and, as a result, it is possible for the rotor (2) to pivot unobstructed, even at a very high velocity. The system (3), with the help of the compressor (51), enables the compensation of any possible minimal losses of air from the accumulation chamber (13) through the watertight pivoting joints.

When the pressure in the chamber (13) becomes excessive, due to the accumulation of the particles, the control system (3) triggers a gas discharge, thus redirecting the pressure to the necessary levels to avoid the entry of the (liquid) medium into the accumulation chamber (13), whilst not inhibiting the expulsion of the denser components. When the material accumulated in the accumulation chamber (13) reaches a certain level, the system triggers its release into a reservoir.

In the end, when using liquids, this system (3) allows the regulation of the pressure in the accumulation chamber (13) in such a way as to counteract, through an increase or decrease in the force applied, the expulsion of aggregates out of the cells, (41) thus obtaining an extraction material that is more or less dense. During its passage through the inlet chamber (30), the fluid is distributed between the inlet vanes (35).

As the higher density components offer greater resistance to acceleration, they will move in a relative motion in comparison to their fluid medium and, particularly if the space between the inlet vanes (35) is sufficiently limited, this will cause a compacting of the higher density components against the vane that follows them in the rotational motion.

A thin layer of the higher density material will form along the vane and will progressively increase in mass whilst the penetration front will be reduced. The mass increases the centrifugal force. A small penetration front allows velocity of movement through the fluid medium. This compacting phenomenon will therefore assist the movement of the higher density components from the separation chamber (31) to the accumulation chamber, (13) and subsequently their expulsion. The fluid that has been modified by this process then enters into the separation chamber (31).

In the event that the grill (34) is not used, the centrifugal force in the separation chamber (31) propels the higher density components directly into the accumulation chamber (13). If, however, the grill (34) is used, the centrifugal force forces them into the collection cells (41) of the grill, (34) and from there towards the accumulation chamber (13). The distance that these components have to travel is equal to the difference between large and small radii of the separation chamber (31). We have named this distance as the "critical space". This movement is limited by the viscosity of the fluid medium and is aided, as we have already mentioned, by a high mass-advancement front ratio of the high density body. Obviously, the shorter the critical space to travel and the slower the flow of the fluid along the channels between the separation vanes (36), the bigger the radius of spherical particles with the same density, or the smaller the mass-advancement front ratio of the laminar aggregates.

These components accumulate in the collection cells (41) as the liquid medium is replaced and as they reach the outlet of the apertures (42). Since the components are propelled by a force greater than the pressure in the accumulation chamber (13), a force that is further increased by the condensation that occurs in the collection cells (41), they exit the grill (34) and enter the accumulation chamber (13).

The higher density components that are expelled into the accumulation chamber (13) then settle in the chamber. As it is common for the expelled components to accumulate and stick to the curved wall of the accumulation chamber (13), a polishing blade is used to remove them. This polishing arm rotates more slowly than the rotor (2) due to the gear pair (19)(20) set with an appropriate transmission ratio.

We will now move on to consider the advantages of certain technical solutions which characterize this separator:

A) The separation chamber (31) with a circular crown cross-section has the advantage over a cylindrical chamber of having a "critical space" which can be very small, even down to the micrometer. It is also possible to achieve the desired flow rate by means of an equal and congruous increase in the two radii. By "critical space" we mean the distance that the body to be separated from the fluid medium must travel in order to emerge from the flux that would otherwise transport it, unseparated, outside the separator. As we have discussed, in the case of this apparatus, the "critical space" is the difference between the external and internal radii of the circular crown section of the separation chamber (31).

B) This type of separation chamber (31) allows for a very large rotation radius without the need for a proportional increase in the "critical space" and, as a result, it also enables a proportionally high centrifugal force. In spite of high angular velocities, the thickness of the fluid for being limited, also the pressure derived from the centrifugal force will be limited. Thanks to this, watertightness of the pivoting joints will be adequate.

C) The extraction and thus the definitive separation of the higher density components is not entrusted to a cochlea. Instead it occurs directly via the expulsion of the components into the accumulation chamber. This ensures that the higher density particles are separated from a gaseous medium prior to evacuating the separation chamber and as such it is possible to obtain a fluid medium that is completely devoid of these particles. This constitutes an important point of distinction from other centrifugal separators such as: DE 100 35 055 A1 (INNOVA ENTWICKLUNGS) or WO 2004/050255 A2 where there is no possibility of separating the solid (or semi-solid) particles from a fluid medium, and it is only possible to separate two fluids with differing densities. The solid particles that are separated off from a liquid medium in the above-mentioned patents are not able to run off as they would clog up the outlet channels. This would be the case for both gaseous and liquid mediums.

D) The rotation of the fluid does not rely on friction with the walls of the separation chamber. (31) Nor, as a consequence, is the rotation quicker for strata with more direct contact with the walls than those further away. The presence of the separation vanes (36) ensures a uniform application of force to all the strata of the fluid and, at the same time, they continue to compact the higher density components, therefore aiding their expulsion. The separation vanes (36) allow the use of the separator also on mixtures in a gaseous medium since they generate a uniform force and rotation in all strata.

E) The grill (34) also enables the use of this separator at very high angular velocities on mixtures in a liquid medium. Furthermore, the grill limits turbulence in the case of mixtures in both a liquid and gaseous mediums.

F) The inlet vanes (35) not only initiate propulsion but also modify the distribution of the components of the mixture through concentrating the higher density components and forming a layer of increased mass and smaller penetration front, which can then be expelled more rapidly.

G) As is the case with all centrifugal separators, but with the distinctive feature that this separator can also be used with mixtures in a gaseous medium, there is no need to change any filters.

Production Method of the Separator

The main aspects that condition the design of a separator are as follows:

The flow rate of the fluid to be treated.

The viscosity of the medium.

The dimensions of the higher density components.

The density of the components to be extracted.

The main variable structural elements in our separator are as follows:

1) The Separation Chamber (31)

Characterized by:

A) The critical space: This, in this case, is the difference between the external and internal radii of the separation chamber (31). This space, as we have already pointed out, can be very small and, in order to maintain the necessary flow rate, it is possible to increase the two radii of the separation chamber (31).

This also carries two advantages with it:

1. The space that the components have to travel, in migrating through the medium to be expelled, is reduced.
2. An increase in the rotation radius will generate a proportional increase in the centrifugal force which propels them though the fluid medium towards the accumulation chamber (13).

Through these two phenomena, a suitably limited run-through time through the "critical space" is obtained.

B) The useful length of the separation chamber (31): represented by the length of the part of the external surface of the separation chamber (31) that is not covered by the two cover plates (28) (29).

C) The internal radius of the separation chamber (31).

The following must be taken into consideration:

The centrifugal vector is, on scalar value, proportional to the mass (and thus to the product of the density by the volume or, in the case of substances in a solution or gas, to the molecular mass).

The velocity at which the higher density components move towards the collection cells (41) must be sufficient to reach them before arrival at the point where the fluid begins to deviate on entering the outlet manifold (7). At this point the thrust vector begins to oppose the centrifugal force and can therefore reduce or even neutralize it. Due to this fact, the utility of a separation chamber (31) with a sufficiently large cross-section has a limited critical space and a suitable length. This allows a reduction in the flow velocity in this sector and a transit to the collection cells as rapidly as possible, having a sufficiently long available time.

Through keeping the structural components of the separator constant, it is possible to evaluate an "available time", depending on the flow rate in the inlet pipe. This can be defined as the time available for a particle, with determined characteristics, to cross the distance that we name the "critical space".

Through knowing the volume flow rate (quantity) qv and dividing it by the cross section of the separation chamber (31) Acs, we obtain the mean flow Velocity in the separation chamber (31) Vmcs.

$$qv/Acs=Vmcs$$

Through knowing the length of the separation chamber (31) Lcs and deducting the lengths of the external surface covered by the cover plates (28) (29), we obtain the "available length" of the separation chamber Lucs.

Now it is possible to calculate the travelling time required for crossing it: available time Tu.

$$Lucs/Vmcs=Tu$$

Having established the Critical space Ec., and the available Time Tu., we can now obtain the velocity at which a particle must be travelling to be "captured" in the collection cells (41) of the grill (34), (or to be expelled directly into the accumulation chamber (13)).

$$V=Ec/Tu$$

Where Ec is the "critical space" and Tu is the "available time".

We can extract the RPM (rotation frequency) necessary to obtain this velocity using the following logic:

The other variables to be considered are:

The coefficient of viscosity of the medium (in relation to the temperature): η Cp (centipoise)

The radius of the particles: r

Their density: ρ

As we have already mentioned, we prefer to initially maintain the structural parameters constant (which it will be necessary to change depending on performance and dimensions required).

These are:

The internal radius of the separation chamber: Rics

The external radius of the separation chamber: Recs

The mean radius of the separation chamber: RMcs

The available length of the separation chamber: Lu

The difference between Recs and Rics, (ΔR), which we have named "critical space": Ec.

Having established the cross section and the critical space that we would like the separation chamber to have, we can determine the radius through applying the following formula:

$$R=[(\Delta R^2*\pi+A)/(\Delta R*\pi)]/2$$

Where R is the external radius of the separation chamber Recs and A is the cross section of the separation chamber Acs.

ΔR is the critical space.

The centrifugal force is $$Fc=4*\pi^2*m*R/T^2$$

Where m is the mass of the revolving body onto which the centrifugal force is applied, R is the radius of the rotation plane around which the body turns, and T is the rotation period.

The Stokes formula calculates (for the velocities we are interested in) the highest Velocity V that a spherical body can attain having the radius r, propelled by a force F, in equilibrium with an equal resistance that is generated by the viscosity of the medium in which the movement occurs, whose coefficient is η (in centipoise, cP);

$$V=F/(6*\pi*r*\eta)$$

Therefore it will be:

$$V=[(4*\pi^2*m*R)/T^2]/(6*\pi*r*\eta)$$

where T is the period $$T=1/ts$$

(ts=revs per second).

From there (when considering near spherical particles):

$$m=\rho*\pi*r^3*4/3$$

where ρ is the density of the particles.

Considering the mean radius, between the external and internal radii, of the separation chamber, it will be:

$$V(cm/s)=(\pi^2*r^2*\rho*RM*tm^2)/(4050*\eta)$$

where V is the velocity of a spherical particle with a radius r and mass m that moves through a medium with a coefficient of viscosity p towards the exterior of a separation chamber with a mean radius RM. This chamber pivots with a rotation frequency tm (revs per minute).

Therefore we can extract the necessary tm.

$$tm=\sqrt{[(V*4050*\eta)/(\pi^2*r^2*\rho*RM)]}$$

Furthermore, in establishing the tm, we can obtain the necessary mean radius of the separation chamber.

$$RM=(V*4050*\eta)/(\pi^2*r^2*\rho*tm^2)$$

This calculation is applicable to isolated spherical particles. However, as we have already mentioned, in reality, if a compacting of the particles takes place in the inlet chamber (30), these particles arrive in the separation chamber (31) compacted in the shape of aggregate with a greater mass than that of an isolated particle and with a much greater mass-advancement front ratio than that of the original particles. This increases more the expulsion velocity.

2) Vanes of the Separation Chamber (36)

As already discussed, the purpose of these vanes (36) is to guarantee that the angular velocity of the fluid is the same as that of the rotor (2) and that all the strata of the fluid from the exterior to the interior have the same angular velocity. Furthermore, the compacting process that begins between the inlet vanes (35) is continued between the vanes of the separation chamber (36).

In order to achieve a uniform distribution of the components to be expelled and uniform centrifugal force, it is important that the number of separation vanes (36) used is sufficiently high in number and equal to that of the inlet vanes (35) and that of the longitudinal rows of the cells (41) of the grill (34). In cases where the grill (34) is not used, it is necessary to take into account the following considerations:

In order to prevent the fluid that has been compressed against the anterior surface from returning behind the vane where it could cause a depression, it is necessary to have the right number of vanes (36) fitted.

In approximate terms the propulsion vector, which is perpendicular to the radius of the rotation plane and produced by the inner-most part of a vane, must be in the direction of the external edge of the vane that precedes it in the rotational direction.

For a same number of vanes (36), angle of inclination of the vanes (36) and internal radius of the circular crown, this occurs on a proportional measure to the difference between the external and internal radii of the circular crown which corresponds to the cross section of the separation chamber (31). We have named this "critical space".

Therefore, keeping constant the internal radius of the separation chamber (31) and the inclination of the vanes (36), the smaller the critical space will be, the greater the number of vanes (36).

After we have defined the following: the internal radius of the separation chamber (31), the inclination of the vanes (36) and the critical space; the point of intersection of the aforementioned thrust vector with the external radius of the crown will correspond to the external extremity of the preceding vane. By dividing 360 by the existing angle between corresponding points of two consecutive vanes and the vertex on the rotation axis, we can obtain the minimal number of vanes (36) required for liquid fluids. This is especially the case when the grill (34) is not used.

If the fluid is gaseous, and given that a gaseous fluid is compressible, it is important that the direction of the thrust vector passes through a point on the vane that, for the same radius, is more internal than bigger the angular velocity.

The vanes (36) must be inclined in such a way that their transversal axis forms an angle of 45-60 degrees with the radius that passes through their interior edge. The vanes will preferably be curved on the transversal axis (with an angle at the centre of approximately 20°) with the convexity at the front.

These two details are necessary to neutralize the friction that is produced, on the higher density components, for effect of the reaction force to acceleration, thus creating, simultaneously, a further thrust effect towards the exterior.

These effects are obtained through breaking down the force of reaction to acceleration, produced by progressive increases in the rotation radius in two vectorial components, of which one perpendicular to the transversal axis of the plane of the vane, and the other parallel to transversal axis, that opposes the friction force.

This force will depend on the specific friction coefficient and the angle between the force of reaction to acceleration and the transversal axis of the vane. It will be useful then, to use a material with a small friction coefficient for the separation (36) and inlet vanes (35).

When dealing with extremely dense liquids, it is possible to reduce the number of separation vanes as low as two (or even not to use any at all). However, in this case, it will be necessary to use the grill (34).

3) Inlet Vanes (35)

As we have discussed earlier, the compacting of the particles in order to aid their expulsion occurs in the channels present between the inlet vanes (35). The smaller the space between the vanes (35), the better the compaction will occur. Therefore, a large number of these vanes aid the separation process. It is vital, however, to take into consideration the possible clogging of the channels.

Furthermore, it is important to note that an increase in radius of the inlet chamber and its vanes (35) as well as in the internal radius of the separation chamber (31) will produce increased velocity in the circular movement, generating the acceleration required for the compacting of the particles.

A slight anterior concavity curvature can be useful to slow the sliding of the higher density particles and therefore assisting their compaction. Preferably, the inlet vanes (35) will end where the separation vanes begin (36) so that the aggregates can slide from the anterior surface of the inlet vanes to that of the separation vanes.

Special cases:

When using fluids containing components that are extremely coarse, it will be necessary to triturate the components prior to introducing them into the separator.

If the separator is used to extract the vapour from a fluid mixture in a gaseous medium at high temperatures (e.g. discharge gas derived from combustion); it will be necessary to refrigerate the fluid upstream of the separator in order to avoid any overheating. Such the vapour will be condensed so as to prevent it from returning to its original molecular form after its capture. Since it has a lower molecular mass than nitrogen, cannot be captured if some nitrogen or another higher density gas is present, even in conditions of extremely high angular velocity.

For the extraction of very small (liquid or solid) particles mixed in with the gas, the separation can be assisted by enriching the gaseous mixture (smoke or mist), to be treated, with a liquid emulsion which, after having captured the particles, will be easier to extract.

Through the above method, it is also possible to capture some gases that react selectively with the substances in solution in the emulsified liquid.

INDUSTRIAL APPLICABILITY

This separator can be used for the separation, in continuous flow of mixtures in a liquid medium, therefore for all current uses of centrifugal separators, which is made currently:

Working on several products or substances, e.g.: cheese-making products, fruit and tomato juices, used oils, industrial by-products, etc.

Industrial, civil and laboratory purification processes, e.g.: sewage water and industrial discharge purification, or for producing drinking water. Extraction procedures in a variety of sectors (chemical, food, industrial etc).

As this separator can also be used on mixtures in a gaseous medium, even if they flow at high velocities, it lends itself to several possible uses: vacuum cleaners, air purifiers, purifiers from fumes and gases, purifiers for exhaust fumes and gases, civil, industrial and automotive uses.

On a more general note:

It can be used for the purification from smoke, mists, dust, and for the separation of other contaminant particles from the air (bacteria, viruses, pollen, mites etc.).

It can be used in the separation of components with differing density or molecular mass which form a gaseous mixture (gas/vapours, gases with differing molecular mass); industrial, laboratory and civil processes (e.g.: extraction or separation of the vapour from a gas/vapour mixture or of a heavy gas from contaminated air; dehumidification etc.)

Its use can extend to the extraction of one gas mixed with another after the reaction of the gas with a substance in a pulverized or nebulized solution.

The invention claimed is:

1. A centrifugal separator apparatus for separating continuously flowing [liquids or gases] *mixtures in a liquid or gaseous medium*, wherein *higher density* components present on entry [is] *are* absent when the [liquids or gases exit] *medium exits* the separator, comprising:

a rotor with a separation chamber, the separation chamber having an annular cross-section and an uncovered outer surface to provide a centrifugal force [in the separation chamber to act], *said centrifugal force acting* in a perpendicular direction to flow of mixture, thereby expelling *the* higher density components directly into an accumulation chamber;

a housing with the rotor and the accumulation chamber contained inside, the [housing] *accumulation chamber* for accumulating and draining off the expelled higher density components; and a control system, the control system for regulating opposing pressure to a separating centrifugal force, thereby limiting an expulsion of median density component, simultaneously expelling [high] *the higher* density components and allowing high angular velocities with liquid fluids.

2. The apparatus according to claim 1, wherein a reduction in angular velocity [is disregarded] due to friction of the rotor with a liquid that would invade the accumulation chamber *is prevented*.

3. A centrifugal separator apparatus for separating continuously flowing [liquids or gases] *mixtures in a liquid or gaseous medium*, wherein components present on entry [is] *are* absent when the [liquids or gases exit] *medium exits* the separator, comprising:

a rotor with a separation chamber, the separation chamber having an annular cross-section and an uncovered outer surface to provide a centrifugal force [in the separation chamber to act], *said centrifugal force acting* in a perpendicular direction to flow of mixture, thereby expelling *the* higher density components directly into an accumulation chamber;

a grill inserted to cover [an outer wall of] the separation chamber *from the outside*, the grill [being in direct] *allowing the separation chamber to remain in* communication with the accumulation chamber;

a housing with the rotor and the accumulation chamber contained inside, the [housing] *accumulation chamber* for accumulating and draining off the expelled higher density components; and a control system, the control system for regulating opposing pressure to a separating centrifugal force, thereby limiting an expulsion of median density component, simultaneously expelling [high] *the higher* density components and allowing high angular velocities with liquid fluids.

4. The apparatus according to claim [3] *1*, wherein the rotor further comprises:

[a separation chamber] *a diaphragm chamber, the diaphragm chamber located inside the separation chamber*;

an inlet chamber, the inlet chamber located [on] *above* the [separation] *diaphragm* chamber;

an outlet chamber, the outlet chamber located below the [separation] *diaphragm* chamber;

an upper cover plate, the upper cover plate located above the inlet chamber; *and* a lower cover plate, the lower cover plate located below the outlet chamber[; and a diaphragm chamber, the separation chamber located inside the diaphragm chamber].

5. The apparatus according to claim [4] *3*, further comprising collection cells, the collection cells positioned on the grill, perpendicularly to *an* axis of rotation.

6. The apparatus according to claim [5] *4*, wherein the inlet chamber further comprises:

a plurality of vanes, the plurality of vanes being attached to the upper cover plate and an upper wall of the diaphragm chamber; wherein:

the plurality of vanes are mounted in a radial symmetry, tilted backwards in relation to direction of rotation, and optionally curved; and the plurality of vanes ensure propulsion of mixture to be treated [to] *and* bring about a compaction of higher density components, facilitating their migration through a medium upon reaching the separation chamber.

7. The apparatus according to claim [6] *1*, wherein [the] *a* plurality of vanes are mounted with radial symmetry in the separation chamber.

8. The apparatus according to claim [6] *7*, wherein:

the plurality of vanes are tilted backwards in relation to a direction of rotation to create an angle of about 45-60 degrees with a radius of a rotation plane passing through innermost extremities of the vanes;

the plurality of vanes are curved on an axis perpendicular to an axis of rotation, with convexity directed toward front and a central angle of about 20 degrees; and the plurality of vanes continue through longitudinal lateral walls of the collection cells of the grill.

9. The apparatus according to claim 8, further comprising:

separation vanes;

channels, the channels located in between the separation vanes and communicates with the collection cells; wherein:

an inner edge of the plurality of vanes adhering to a tubular wall portion of the diaphragm chamber, the tubular wall portion being closed except in connection with the inlet chamber and the outlet chamber; and an outer edge of the plurality of vanes, if the grill is not used, being in direct contact with the accumulation chamber, except its extremities at the belt which are covered by the plates.

10. The apparatus according to claim [9] *4*, wherein the diaphragm chamber further comprises:

an upper wall, the upper wall located directly below the inlet chamber;

a lower wall, the lower wall located directly above the outlet chamber; wherein:

the tubular wall is an outer circumference of the diaphragm chamber;

a space between the upper wall and the lower wall being completely enclosed forming a volume defined by two truncated cone shaped structures;

a driving shaft is fitted into center of the upper wall for a mechanical transmission of the rotor; and a watertight ball bearing mounted onto a pivot of an outlet manifold through an aperture in the lower wall.

11. The apparatus according to claim [5] *3*, wherein the grill further comprises:

a tubular structure, the tubular structure enclosing an entire exposed surface of the separation chamber;

bored channels, the bored channels embedded in a wall of the grill and parallel to an axis of rotation of the grill; wherein the *cross section of the* channels [are] *is* a semi-circle or semi-ellipse such that a convexity portion of the semi-circle or the semi-ellipse is directed toward an exterior direction;

an axis of a chord of a cross-section passes through the axis of rotation;

the bored channels are equal in number to the number of vanes present in the separation chamber; and a plurality of walls [are subdivided] *subdivide* transversally *the channels* into an equal number of collection cells.

[12. The apparatus according to claim 11, wherein:

a mixture is a dense medium and an amount of longitudinal rows of the collection cells are equal to an amount of longitudinal rows of apertures; and the amount of longitudinal rows of apertures are equal to a length of an external circumference of the grill divided by a circular arc.]

13. The apparatus according to claim 5, wherein outer walls of the collection cells are completely exposed when mixture is *in* a gaseous medium.

14. The apparatus according to claim 5, wherein outer walls of the collection cells are pierced by circular apertures with a diameter proportionally limited to a superficial tension of a medium and to a total density of the mixture.

15. The apparatus according to claim 14, wherein an external surface of the grill has a polygonal section such that apertures are situated on a flat surface.

16. The apparatus according to claim 4, wherein the inlet chamber further comprises[:

an upper portion of the inlet chamber, the upper portion of the inlet chamber being a wider end of an empty truncated cone shaped structure and a lower portion of the inlet chamber being a narrower end of an empty truncated cone shaped structure;

an inlet axial tube, the inlet axial tube penetrating an aperture, the penetration means being a watertight moveable juncture to enable the rotor to revolve;

an upper wall portion of the diaphragm chamber being located below the upper cover plate and an outer surface portion of the diaphragm chamber being open to the separation chamber; and wherein the upper cover plate enclosing the inlet chamber and an aperture in a center region of the upper cover plate] *a partially enclosed space located directly above the diaphragm chamber, an upper wall portion of the diaphragm chamber forming a lower enclosure of the inlet chamber, wherein the upper cover plate is an upper enclosure of the inlet chamber, and wherein an exterior portion of the inlet chamber is adapted to communicate with the separation chamber*.

17. The apparatus according to claim 4, wherein the separation chamber has a circular crown cross-section and its internal and external radii remain constant throughout the separation chamber, forming a tubular shaped volume.

18. The apparatus according to claim 4, wherein:

the separation chamber has an uncovered external surface except two surfaces at belt corresponding to levels of apertures at belt, enabling the separation chamber to communicate with the inlet and outlet chambers; and the upper cover plate and the lower cover plate are curved in order to cover the two surfaces at belt.

19. The apparatus according to claim 4, wherein the upper cover plate further comprises*:* a hermetic seal, the hermetic seal continuously covering the inlet chamber, the separation chamber, [the] *a* grill and a tract in belt of outer surface of the separation chamber at a level with communication of the chamber with the inlet chamber*; and a central aperture housing an inlet axial tube through a watertight moveable juncture*.

20. The apparatus according to claim 4, wherein the lower cover plate further comprises:

a hermetic seal, the hermetic seal continuously covering the outlet chamber, *a grill and* a tract at bottom of external surface of the separation chamber at level corresponding to communication with the outlet chamber; [and an outlet axial tube, the outlet axial tube being housed in its central aperture through a watertight moveable juncture] *and a central aperture housing an outlet axial tube through a watertight moveable juncture*.

21. The apparatus according to claim 4, wherein the outlet chamber further comprises:

a partially enclosed space, the partially enclosed space being located directly below the diaphragm chamber and a lower wall portion of the diaphragm chamber being an upper enclosure of the outlet chamber; and wherein:

the lower cover plate is a lower enclosure of the [outer] *outlet* chamber; and an exterior portion of the outlet chamber is adapted to communicate with the separation chamber.

22. The apparatus according to claim 21, further comprising:

an outlet manifold, the outlet manifold housed in the outlet chamber;

an outlet axial tube, the outlet axial tube protruding through the lower cover plate[,] *by means of* a juncture being moveable and watertight; and a space between the outlet manifold and the outlet chamber, enabling the rotor to freely rotate.

23. The apparatus according to claim [22] *1*, wherein the housing further comprises:

an inlet tube; the inlet tube eccentrically located on one end of the housing[, extending from an exterior portion of the housing to an interior portion of the housing];

an inlet manifold, the inlet manifold being located inside the housing and being connected to the [interior portion of the] inlet tube[; and a discharge pump, the discharge pump located inside the housing and opposite the inlet manifold, wherein a capsule of the discharge pump being a discharge manifold when the discharge pump is not used].

24. The apparatus according to claim [23] *1*, wherein[:

the capsule of the outlet pump communicates with the separation chamber of the rotor by means of an outlet axial tube; and the outlet axial tube penetrates the outlet chamber through a central aperture of the lower cover plate] *the housing further comprises a discharge pump located inside the housing and connected to an outlet axial tube, the discharge pump comprising a capsule acting as a discharge manifold when the discharge pump is not used*.

25. The apparatus according to claim 23, wherein the inlet manifold further comprises an inlet axial tube, the inlet axial tube connected to the inlet manifold, wherein:

the rotor is connected to the inlet axial tube through an aperture in center of the upper cover plate; and a juncture being a watertight moveable means.

26. The apparatus according to claim 25, wherein the inlet axial tube, the outlet axial tube, and the outlet manifold are immobile such that the rotor revolves around the inlet and outlet axial tubes.

27. The apparatus according to claim 25, wherein the outlet [axial tube] *manifold* is connected to the outlet [manifold] *axial tube* and equipped with vanes and housed in the outlet chamber.

28. The apparatus according to claim 27, wherein:

the outlet chamber and the entire rotor revolves around the outlet manifold; and the outlet manifold is fixed.

29. The apparatus according to claim [3] *1*, wherein the accumulation chamber and the rotor are contained inside the housing and components to be separated from fluid are expelled directly *into the accumulation chamber* during their transit through the separation chamber.

30. The apparatus according to claim 3, wherein the control system further comprises a pressure sensor [or] *and* a liquid level sensor.

31. The apparatus according to claim 3, wherein the control system further comprises:

a first electromagnetic valve, the first electromagnetic valve enabling discharge of gas to an exterior;

a second electromagnetic valve, the second electromagnetic valve enabling communication of the accumulation chamber with a gas compressor;

a third electromagnetic valve, the third electromagnetic valve suitable for dense liquids allowing passage of the liquid into an ancillary reservoir.

32. The apparatus according to claim 3, wherein the control system further comprises a gas compressor.

33. The apparatus according to claim 3, wherein the control system further comprises an electromechanical inlet diaphragm and an electromechanical outlet diaphragm.

34. The apparatus according to claim 33, wherein the electromechanical outlet diaphragm is a valve with an adjustable aperture pressure when mixture is a liquid medium.

35. The apparatus according to claim 3, wherein the control system comprises a reservoir.

36. The apparatus according to claim 3, wherein the control system comprises an electronic control circuit, wherein the electronic control circuit integrates functions of components of the control system by maintaining gas pressure levels and volumes of liquid in the accumulation chamber.

37. The apparatus according to claim [36] *3*, wherein the control system further comprises an axial pump, a turbidimeter and a densimeter.

* * * * *